United States Patent [19]

Novak et al.

[11] Patent Number: 5,378,994
[45] Date of Patent: Jan. 3, 1995

[54] NON-CONTACT CAPACITANCE BASED IMAGE SENSING METHOD AND SYSTEM

[76] Inventors: James L. Novak, 11048 Malaguena Ln. N.E.; James J. Wiczer, 4915 Glenwood Hills Dr. N.E., both of Albuquerque, N. Mex. 87111

[21] Appl. No.: 163,555

[22] Filed: Dec. 9, 1993

Related U.S. Application Data

[62] Division of Ser. No. 514,051, Apr. 24, 1990, Pat. No. 5,281,921.

[51] Int. Cl.$^6$ ............................................. G01R 27/26
[52] U.S. Cl. .................................. 324/671; 324/663; 324/687; 382/58; 173/4; 65/61
[58] Field of Search ............... 324/661, 662, 663, 671, 324/686, 687, 690; 361/278; 382/58; 173/1, 4; 65/61

[56] References Cited

U.S. PATENT DOCUMENTS

| | | | |
|---|---|---|---|
| 4,103,226 | 7/1978 | Fromson et al. | 324/687 X |
| 4,481,616 | 11/1984 | Matey | 358/342 X |
| 4,814,691 | 3/1989 | Garbini et al. | 324/687 |
| 4,996,492 | 2/1991 | Anderson et al. | 324/687 |
| 5,130,661 | 7/1992 | Beck et al. | 324/663 |
| 5,140,272 | 8/1992 | Nishimatsu et al. | 324/662 |
| 5,281,921 | 1/1994 | Novak et al. | 324/671 |

OTHER PUBLICATIONS

CAD Directed Robotic Edge Finishing, Cliff Loucks, Colin Selleck, and Siegfried Thunborg, Sandia National Laboratories, Albuquerque, N. Mex. Dec., 1988; RO-BOTS 13 Conf. Proc. pp. 12.67–12.84.

Robot Applications In Buffing, Polishing, Grinding, and Deburring, Danny C. McCoy and Atlas Hsie, Robots 8 Conf. Proceedings, Jun. 4–7 1984, Detroit Mich., pp. 5.39–5.51.

An Approach to Automated Deburring by Robot Manipulators, H. Kazerooni, J. J. Bausch and B. M. Kramer, Dec. 1986, vol. 108, Journal of Dynamic Systems, Measurement, and Control, pp. 354–359.

Acoustic Emission Feedback for Deburring Automation, David A. Dornfield, Toshiki Masaki, Proceeding from the Symposium on Robotic Metal Removal, R. L. Hollowell, ed., 1987 ASME Winter Annual Meeting, Boston, Dec. 1987, pp. 81–89.

Basic Principles In Designing Highly Reliable Multi--Terminal Capacitor Sensors and Performance of Some Laboratory Test Models, Willem Chr. Heerens, Sensors and Actuators, 3 (1982/83) pp. 137–148.

Feasibility of Using Simple Sensors for In–Process Measurement, K. F. Martin, 17th International Symposium on Automotive Technology, pp.: 87160/1–9 vol. 2 1987.

Proximity Sensors That Can Take The Heat, Doug Lawrence, Solvetech, Inc., Sensors, pp. 37–40, Dec. 1986.

Development of Sensor Controlled Robot for Deburring, Atsuhiko Noda, Toshikazu Tanaka, Yasutsugu Watanabe, Kouichi Nishine, Yutaka Yamamoto, Shiroh Horiguchi Proceeding of the 15th International Symposium on Industrial Robots, pp. 207–214, Dec., 1986.

*Primary Examiner*—Kenneth A. Wieder
*Assistant Examiner*—Glenn W. Brown

[57] ABSTRACT

A system and a method is provided for imaging desired surfaces of a workpiece. A sensor having first and second sensing electrodes which are electrically isolated from the workpiece is positioned above and in proximity to the desired surfaces of the workpiece. An electric field is developed between the first and second sensing electrodes of the sensor in response to input signals being applied thereto and capacitance signals are developed which are indicative of any disturbances in the electric field as a result of the workpiece. An image signal of the workpiece may be developed by processing the capacitance signals. The image signals may provide necessary control information to a machining device for machining the desired surfaces of the workpiece in processes such as deburring or chamfering. Also, the method and system may be used to image dimensions of weld pools on a workpiece and surfaces of glass vials. The sensor may include first and second preview sensors used to determine the feed rate of a workpiece with respect to the machining device.

29 Claims, 7 Drawing Sheets

NON-CONTACT CAPACITANCE BASED IMAGE SENSING METHOD AND SYSTEM

The United States Government has rights in this invention pursuant to Contract No. DE-AC04-76DP00789 between the United States Department of Energy and AT&T Technologies, Inc.

This application is a divisional of copending application Ser. No. 07/514,051, filed on Apr. 24, 1990, now U.S. Pat. No. 5,281,921, the entire contents of which are hereby incorporated by reference.

TECHNICAL FIELD OF THE INVENTION

The present invention is directed to high resolution image sensing for imaging desired surfaces of a workpiece, and more particularly to sensing any effects in an electric field developed by a non-contact capacitance sensor disposed over desired surfaces of the workpiece.

BACKGROUND OF THE INVENTION

Conventionally, capacitance sensors have been used for measuring capacitance formed between a workpiece and a distributed electrode of a sensing probe. In such conventional systems, one electrode of the sensor must be electrically involved in the system, which is typically accomplished by mechanically contacting the workpiece to the capacitance senor. In the conventional systems, the workpiece accordingly becomes one electrode of the capacitance electrodes. A disadvantage of these conventional capacitance systems is that the workpiece being sensed is limited to a conductive object, such as a metal object, which is necessary to form one plate of the conventional capacitance sensor. The necessity of using a metal object as the workpiece limits the variety of workpieces that may be sensed because the sensor is directly connected to the workpiece in order to form one plate of the sensor.

Other types of capacitance based sensors rely on physical contact between the probe electrode and the workpiece electrode with a known dielectric intermediary. When these contacting capacitance sensors are used, vibrations of the workpiece may cause the sensors to wear rapidly. As a result, the sensor must be frequently calibrated since the capacitance parameters for the sensor in the workpiece will be altered and differences from the initially calibrated capacitance parameters must be compensated for. Accordingly, such contacting capacitance sensor systems have a reduced accuracy because of frequent replacement and recalibration.

As will be described further hereinbelow with reference to the preferred embodiments, the present invention is directed to a method and a system for imaging desired surfaces of a workpiece by a non-contact capacitance sensor. The non-contacting capacitance sensor of the present invention overcomes the above described disadvantages in both the conventional and contacting capacitance sensor systems and allows a wide variety of workpieces having a significant conductivity or a dielectric constant significantly different from air to be imaged. The novel method and system of the present invention provides a low cost and time efficient imaging system for a high resolution image sensor.

OBJECTS OF THE INVENTION

It is an object of the present invention to provide a method and a system for imaging desired surfaces of a workpiece by sensing any effects in an electric field developed between first and second sensing electrodes of a sensor caused by the workpiece being disposed within the electric field.

It is another object of the present invention to provide a method and a system for machining, deburring or chamfering desired surfaces and edges of a workpiece by imaging the desired surfaces of the workpiece by sensing any effects in an electric field developed between first and second sensing electrodes of a sensor caused by the workpiece being disposed within the electric field and adjusting the machining, deburring or chamfering means respectively in response to imperfections that are detected by imaging the surfaces and edges of the workpiece.

It is still another object of the present invention to provide a method and a system, for imaging the width, height and thickness of weld pools on a workpiece, weld back side penetration and surfaces of a glass vial by sensing any effects in an electric field developed between first and second sensing electrodes of a sensor caused by the workpiece being disposed within the electric field.

It is still another object of the present invention to provide a method and a system for measuring the feed rate of a workpiece passing through machining means.

SUMMARY OF THE INVENTION

The above mentioned objects of the present invention are accomplished by the novel system and method which images desired surfaces of a workpiece. The method and system of the present invention utilizes a sensor having first and second sensing electrodes positioned above and in proximity to a workpiece for developing an electric field between the first and second sensing electrodes of the sensor in response to input signals that are applied to the sensor. As the location of the sensor changes with respect to desired surfaces of the workpiece, any effects in the electric field produced by the workpiece being disposed with the electric field are sensed. Image signals are developed in response to any disturbances sensed in the electric field. These image signals may be any signals designed to relate the effects sensed in the electric field (surface discontinuities, etc.) to the position on the workpiece and need not be usable for developing visual images. Thus, imaging of the desired surfaces of the workpiece may be used for automating the inspection of the surfaces of the workpiece.

The disturbances in the electric field that are sensed may also be used for developing control signals corresponding to contours of the monitored surfaces. The control signals may then be used for adjusting machining means for machining the workpiece in response to the contours of the surfaces. The machining means may include deburring means for removing burrs from desired edges of the workpiece and chamfering means for chamfering desired edges of the workpiece to predetermined angles.

The method and the system of the present invention may also be utilized for monitoring the width, height and thickness of weld pools on a workpiece and the weld back-side penetration. Disturbances in the electric field are detected as previously described and the disturbances in the electric field are processed in order to develop image signals for indicating the width, height and thickness of weld pools on the workpiece and the weld back-side penetration. The system and method of the present invention may further monitor surfaces of a glass vial and develop image signals for indicating the locations of imperfections on the glass vial.

The feed rate of a workpiece passing by machining means may be measured in a further embodiment of the present invention. The sensor may include first and second sensors separated by a predetermined distance so that first and second image signals of the workpiece may be developed. The time difference between the development of the first and second image signals is measured to calculate the feed rate based on the predetermined distance between the first and second sensors.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow in the accompanying drawings which are given by way of illustration only, and thus are not limitative of the present invention and wherein.

DETAILED DESCRIPTION OF THE PREFERRED EMBODIMENTS

Figure 1:
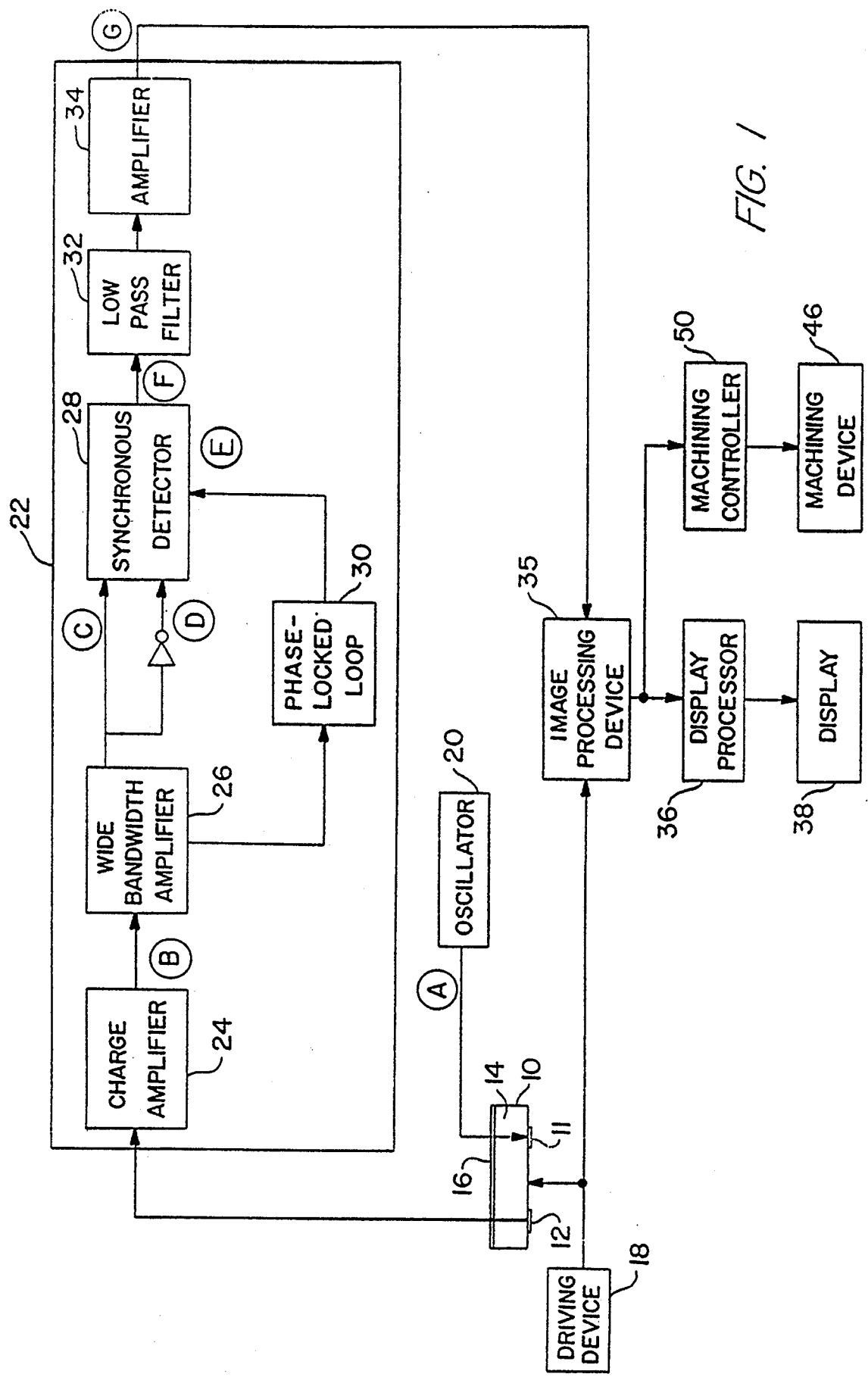
FIG. 1 schematically illustrates a first embodiment of the present invention for monitoring and displaying a workpiece.

A system for monitoring and displaying desired surfaces in a preferred embodiment of the present invention is illustrated in FIG. 1. The preferred embodiment will be described hereinafter with reference to FIGS. 1-4.

FIG. 1 illustrates a sensor 10 having sensing electrodes 11 and 12 disposed on a surface to be presented to the workpiece and a shield 16 disposed on a surface of the sensor opposite to the surface to be presented to the workpiece. The workpiece may be a metal object, a glass vial, a weld pool or any other object having a significant conductivity or a dielectric constant significantly different from air. The sensor 10 has a dielectric substrate 14 for disposing the electrodes 11 and 12 and the shield 16 thereon. An oscillator 20 is connected to the sensing electrode 11 and the sensing electrode 12 is connected to an input of a detection developing circuit 22. The detection signal developing circuit 22 includes a charge amplifier 24 which is connected to the output electrode 12. The output of the charge amplifier 24 is connected to a wide bandwidth amplifier 26.

The output of the wide bandwidth amplifier 26 is input directly to a synchronous detector 28 and to a standard inverter 27 which is also input to the synchronous detector 28. The output of the wide bandwidth amplifier 26 is also connected to a phase-locked loop 30 and the output of the phase-locked loop 30 is connected to the synchronous detector 28. The synchronous detector 28 is connected to a low pass filter 32. An amplifier 34 is connected to the low pass filter 32 and produces the output of the detection signal circuit 22. The output of the detection signal developing circuit 22 is connected to an image processor 35. A driving device 18 is connected to the sensor 10 and the image processor 35. The output of the image processor 35 may be connected to a machining controller 50 and a machining device 46 or a display processor 36 and a display 38.

Figure 2A:
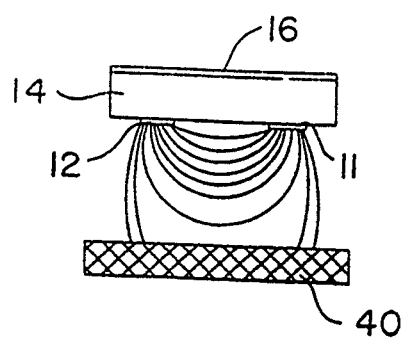
FIGS. 2A and 2B schematically illustrate the electric displacement field that is generated between the sensor and the workpiece in the device of the present invention.
Figure 2B:
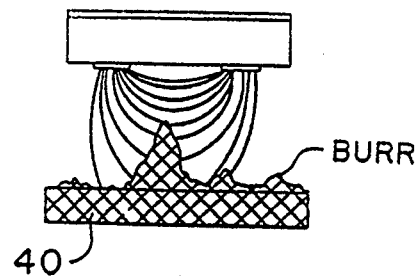

The surface of the sensor 10 having the input electrode 11 and the output electrode 12 is positioned above and in proximity to desired surfaces of a workpiece as shown in FIG. 2(a). The driving device 18 is used to change the location of the sensor 10 with respect to the desired surfaces of the workpiece 40. The driving device 18 may be any conventional device for moving the sensor 10 on the workpiece 40, such as a mechanical stepping device, a positioning incrementer or a robotic arm as are known in the art. Oscillating signals from the oscillator 20 are input to the input electrode 11 and an electric field is developed between the sensor 10 and the workpiece 40 as shown in FIGS. 2(a) and 2(b). The output electrode 12 detects the mutual capacitance between the two electrodes. As seen in FIG. 2(b), imperfections, such as a burr on the workpiece alter the lines of flux in the electric field which are detected as changes in the mutual capacitance of the sensor. A signal which represents the change in the mutual capacitance is input to the detection signal developing circuit 22. The detection signal developing circuit 22 develops an output voltage that is related to the mutual capacitance detected by the sensor which decreases or increases in response to varying surfaces of the workpiece.

Figure 4A:
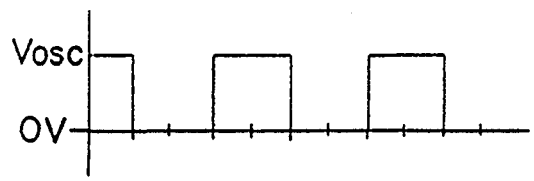
FIGS. 4A-4G are graphs illustrating waveforms at the corresponding nodes of FIG. 1.
Figure 4B:
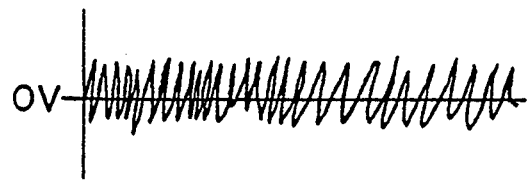

An example of the oscillating signals that are supplied to the input electrode 11 is shown by FIG. 4(a) which corresponds to node (A) of FIG. 1. The change in the mutual capacitance at the output electrode 12 is measured by the charge amplifier 24. The charge amplifier 24 is a conventional operational amplifying circuit and the output signal of the charge amplifier 24 is illustrated in FIG. 4(b) which corresponds to node (B) of FIG. 1.

Figure 4C:
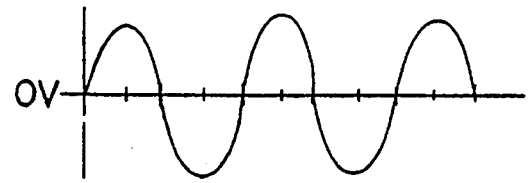
Figure 4D:
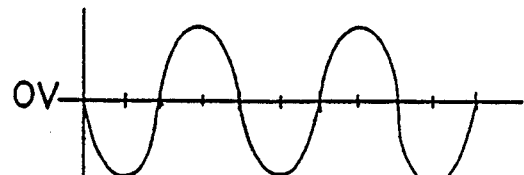

Under some sensing conditions, the signal at node (B) may be much larger than the mutual capacitance signal itself. Next, the wide bandwidth amplifier 26, such as a National Semiconductor LH-0032, amplifies the capacitance signal. FIG. 4(c) illustrates the amplified signal which has an undesired phase shift and corresponds to node (C) of FIG. 1. FIG. 4(d) illustrates an inverted signal of FIG. 4(c) and corresponds to node (D) of FIG. 1. Alternatively, if higher noise levels exist in the mutual capacitance signal, a tuned filter with gain circuit having pairs of standard intermediate frequency transformers and operational amplifiers may be used. The circuit may be designed by one of ordinary skill in the art when a nominal frequency is chosen to accommodate the frequency response of the operational amplifiers, although the frequency of operation is not critical.

Figure 4E:
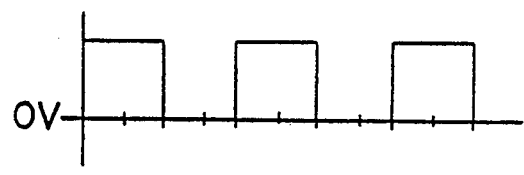
Figure 4F:
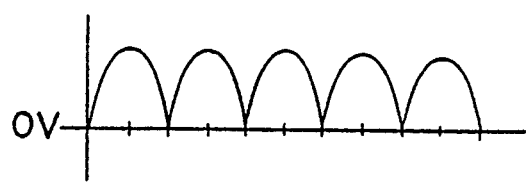
Figure 4G:
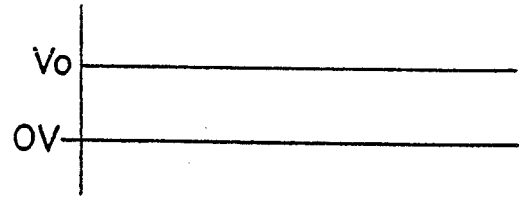

The inverted and non-inverted amplified signals are input to the synchronous detector 28 along with the output from the phase-lock loop 30. The phase-locked loop 30 tracks the oscillator signals. The output of the phase-locked loop 30 is illustrated in FIG. 4(e) and corresponds to node (E) of FIG. 1. In the preferred embodiment, the synchronous detector 28 is a single pole/single throw switch for selecting between the inverted and non-inverted amplified signals in response to the output of the phase-locked loop 30. The synchronous detector 28 serves as a phase sensitive full wave rectifier and outputs the positive portions of the inverted and non-inverted amplified signals which are illustrated in FIG. 4(f) and corresponds to node (F) of FIG. 1. The synchronously detected signal is output to the low pass filter 32 which is a conventional low pass filter and is connected to the amplifier 34 which is a conventional amplifier for developing the final output voltage. The final output voltage is illustrated by FIG. 4(g) and corresponds to node (G) of FIG. 1. The amplitude of this voltage signal is related to the mutual capacitance of the sensor and this signal is modulated in response to the presence of the workpiece.

The modulations in the output signal of the detection signal developing circuit 22 are input to an image processor 35. The image processor 35 develops image signals by processing the modulated output voltages. These image signals may be any signals designed to relate the sensed parameter (surface discontinuity, etc.) to the position on the workpiece and need not be usable to develop a visual image. The image processor 35 processes the modulated output voltages with a conventional machine vision image processing algorithm which may be implemented by one of ordinary skill in the art for desired specific applications. The output of the image processor 35 may be input to a source such as a machining controller 50 and a machining device 46. The machining device 46 may be any conventional device for machining the surface of the workpiece and the machining controller 50 may be implemented by one of ordinary skill in the art to process the image signals for use in controlling the machining device 46.

Figure 3:
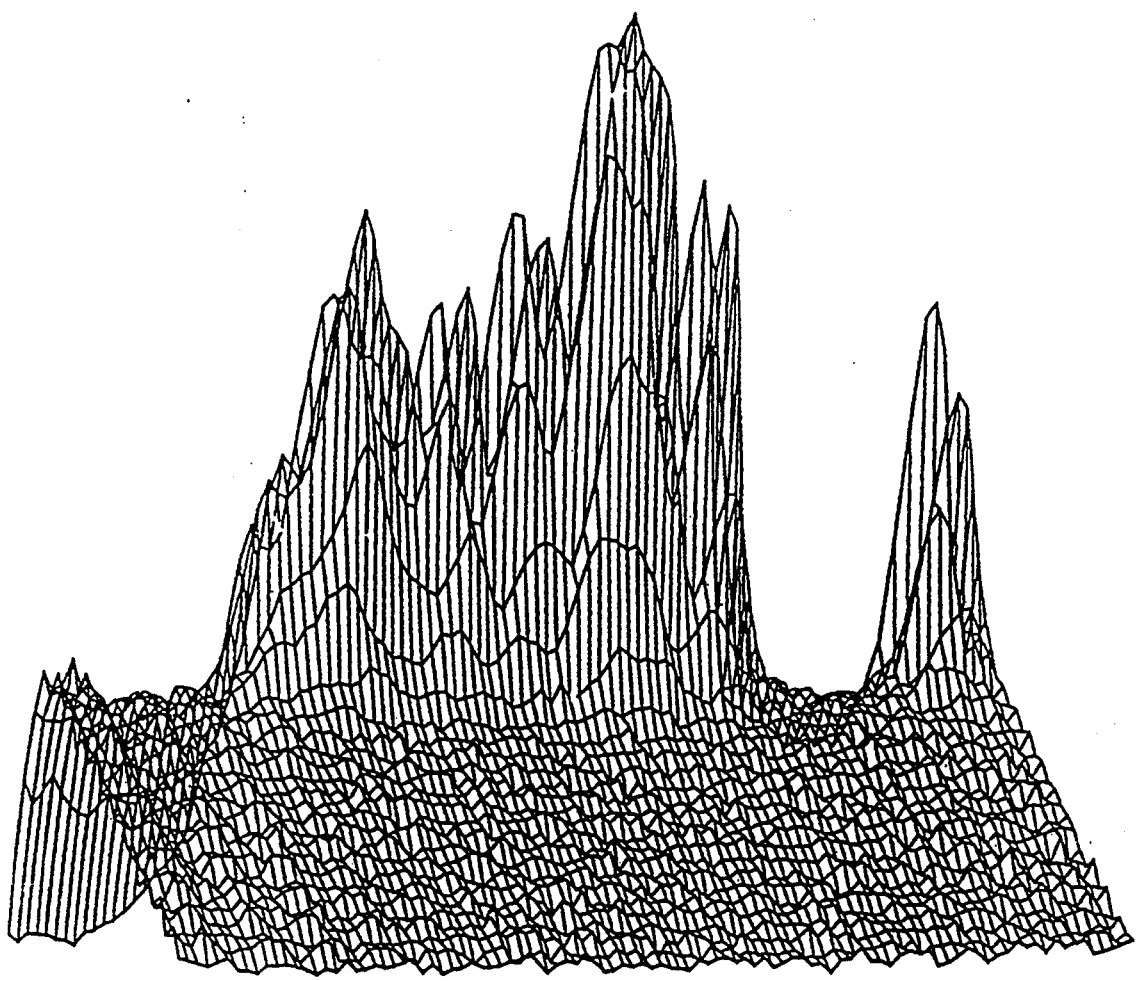
FIG. 3 illustrates a representative display of an edge of the workpiece produced according to the teachings of the present invention.

In a further embodiment, the output of the image processor 35 may be input to a display processor 36 which is selected from suitable conventional processing units and would be implemented and modified by one of ordinary skill in the art in order to display the display image signals. The display signals from the display processor 36 are input to a display 38 along with coordinate signals from the driving device 18. The coordinate signals from the driving device 18 are signals which represent the position of the sensor 10 with respect to the workpiece 40 in x and y coordinate dimensions. The image signals represent the image in the z coordinate dimension. In the present embodiment, the display 38 is a conventional display device and controller having inputs for x, y and z coordinate dimensions. The display may be a conventional CRT, monitor, printer, or any other similar device for displaying the x, y and z coordinate dimensions which represent the surfaces of the workpiece. An example of an image profile is illustrated in FIG. 3. FIG. 3 illustrates a flat area in the foreground of the figure which corresponds to the top-surface of the workpiece and burrs that exist at the edge of the workpiece.

Figure 5:
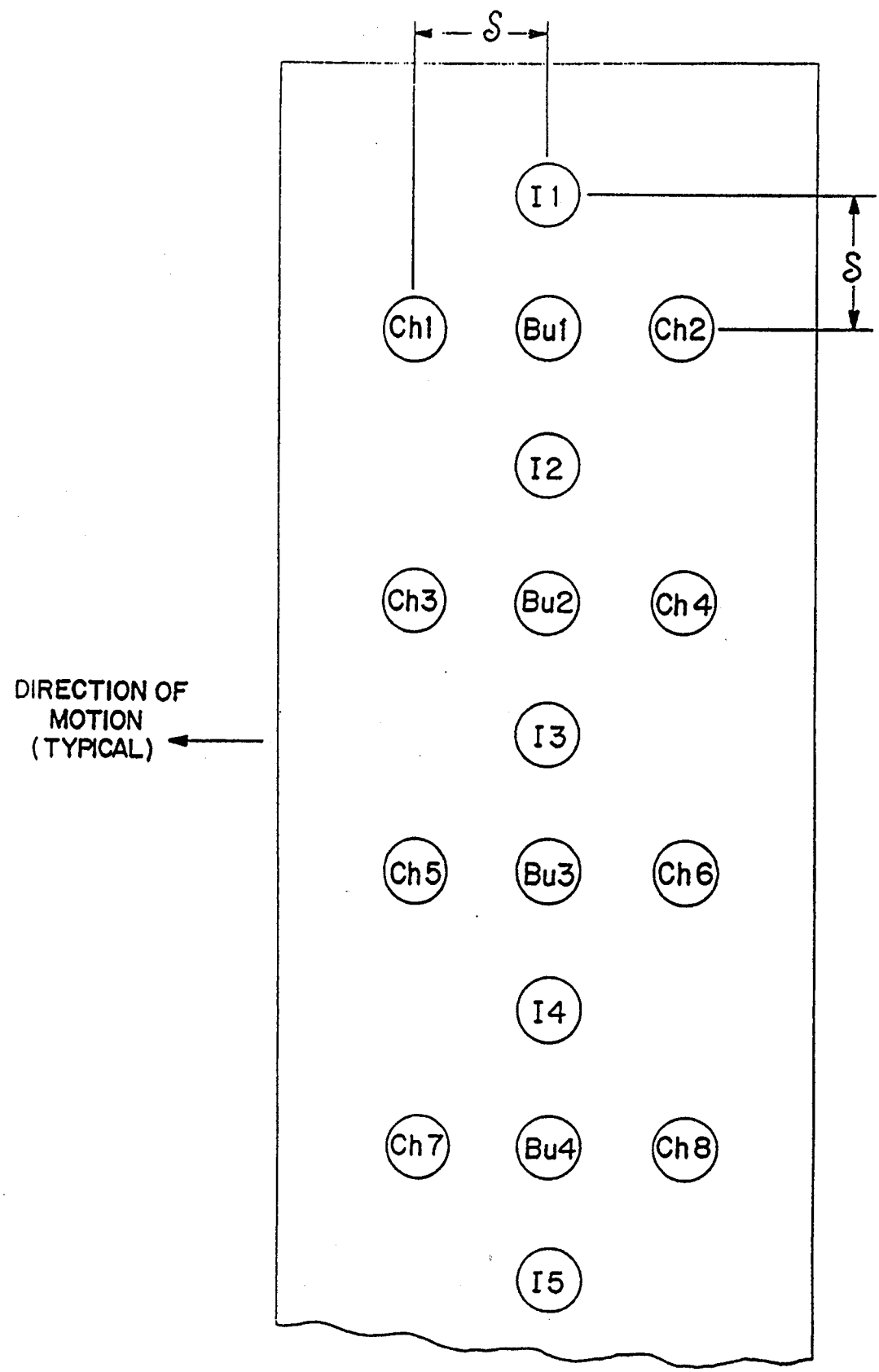
FIG. 5 is a plan view of a sensor having a plurality of electrodes in a second embodiment of the present invention.

A second embodiment of the present invention having an array of electrodes on the surface of a sensor to be presented to the workpiece is illustrated in FIG. 5 and will be described hereinafter.

FIG. 5 illustrates an array of input and output electrodes on the surface of the sensor 10 to be presented to the workpiece. The sensor 10 includes input electrodes I1–I5 and CH1–CH8 and output electrodes BU1–BU4. The array of electrodes are arranged in order to maximize the applications for chamfer and burr sensing. Because sensors are most sensitive to spatial variations orthogonal to the line connecting two electrodes, the electrodes were arranged so that the sensor sensitivity would be maximized in both horizontal and perpendicular sensing directions by observing the output signal from different electrode pairs. Burr sensing requires measurements to be made along the edge of a workpiece and electrodes BU1–BU4 were arranged so that the lines connecting these electrodes with the corresponding input electrodes I1–I5 are perpendicular to the direction of motion of the sensor. In contrast, input electrodes CH1–CH8 were arranged to maximize the sensitivity for chamfer sensing. The electrodes CH1–CH8 are arranged so that the lines connecting these electrodes with ouput electrodes BU1–BU4 are perpendicular to the motion of the sensor. Chamfer sensing requires measurements to be made perpendicular to edges of the workpiece and this arrangement maximizes the sensitivity for chamfer measurements.

The array of electrodes on the sensor 10 allow an image to be acquired in a single pass of the sensor. In designing and fabricating the array of electrodes, multiple sensing elements are arranged to achieve the same high resolution as acquired by a single sensor across the region of interest in increments. The spacing and diameter of the electrodes determine the extent of the electric field and the feasible sensing range and resolution in these dimensions may be selected for the desired application. The array of electrodes may be arranged to surround each desired surface of the workpiece in order to enable imaging of the workpiece.

Figure 9:
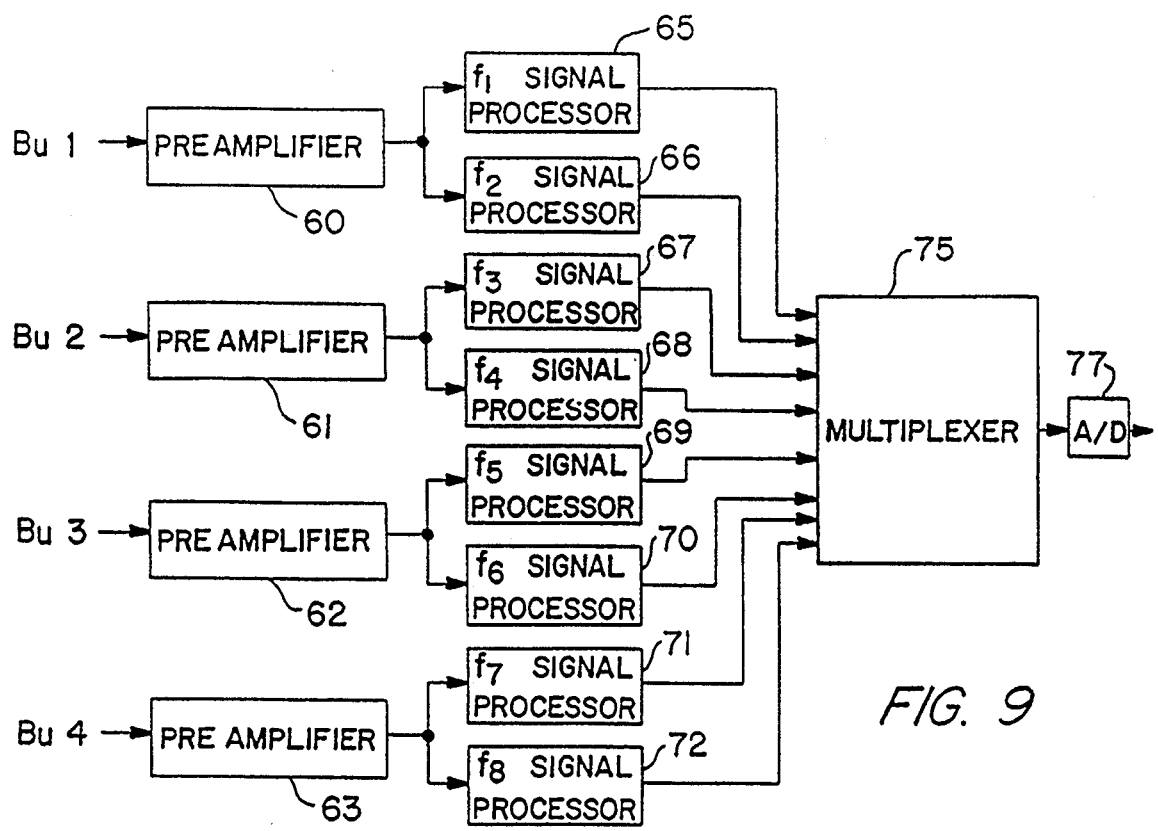
FIG. 9 schematically illustrates an embodiment of the circuitry used in the second embodiment of the present invention.

FIGS. 9 and 10 illustrate two embodiments for acquiring the capacitance signals from the array sensor of FIG. 5. FIG. 9 illustrates a parallel technique which supplies a signal processing channel to each sensing element of FIG. 5. In particular, a first frequency signal is applied to input electrode I1, second and third frequency signals are applied to input electrode I2, fourth and fifth frequency signals are applied to input electrode I3, sixth and seventh frequency signals are applied to input electrode I5 and an eighth frequency signal is applied to input electrode I6. When using the array of FIG. 5 for sensing burrs in this parallel technique, output electrodes BU1–BU4 are connected to preamplifiers 60–63 respectively. The outputs from the preamplifier 60–63 are connected to pairs of signal processors 65–72 as illustrated in FIG. 9. The signal processing channels 65–72 operate in parallel at the eight different frequencies for extracting information from the respective sensing sites. The outputs from the eight signal processing units are connected to a high speed multiplexer 75 which outputs the signal for the appropriate sensing site. An A/D converter 77 outputs a digital logic, binary representation which is input to a display processor for developing a display image as in the first embodiment of the present invention. The preamplifiers 60–63 correspond to the charge amplifier of the first embodiment and the signal processors 65–72 correspond to the detection signal developing circuit 22 of the first embodiment wherein each signal processor operates at different respective frequencies. In this parallel technique, five independent oscillators are required for supplying non-harmonic frequencies to the appropriate input electrode.

Figure 10A:
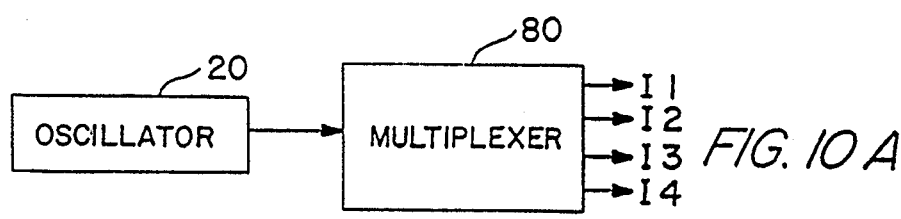
FIGS. 10A and 10B schematically illustrate another embodiment of the circuitry used in the second embodiment of the present invention.
Figure 10B:
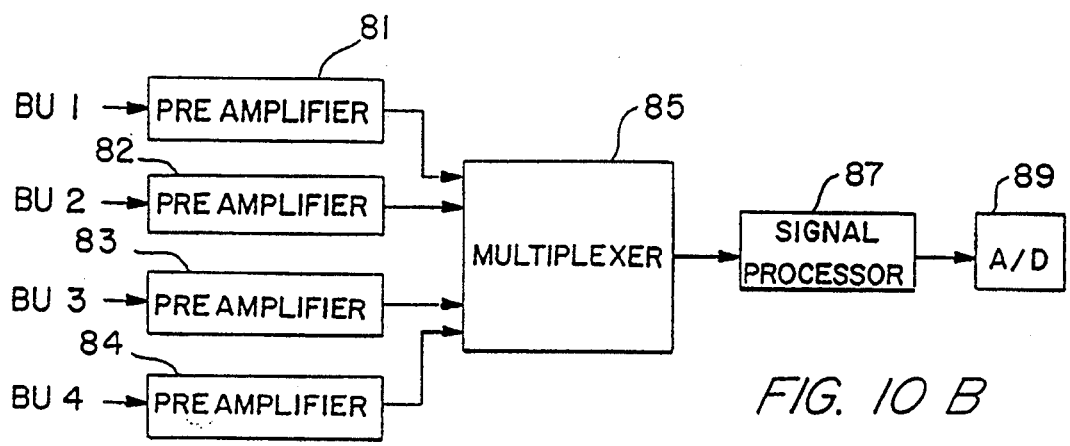

FIGS. 10(a) and 10(b) illustrate a multiplex technique which multiplexes the sensor signals before performing the signal processing. As shown in FIG. 10(a), a multiplex technique is used for the oscillator 20 so that a single oscillator may be used. The multiplexer 80 selects one of the eight different frequencies to be applied to the respective input electrodes I1–I6 and CH1–CH8. The burr sensing electrodes BU1–BU4 are supplied to preamplifiers 80–84 and the corresponding sensor is utilized in response to the channel selected by the multiplexer 80 and the electrode having the oscillating signal applied thereto. The selected sensor is processed by the signal processor 87 and an output level is generated by the A/D converter 89 for display processing.

The parallel and multiplex techniques of FIGS. 9 and 10 both achieve the same result for developing output level signals from the array sensor of FIG. 5. However, the parallel technique acquires data faster with a greater signal to noise ratio while the multiplex technique provides a more compact implementation which uses less equipment and will thereby cost less to fabricate.

Figure 6:
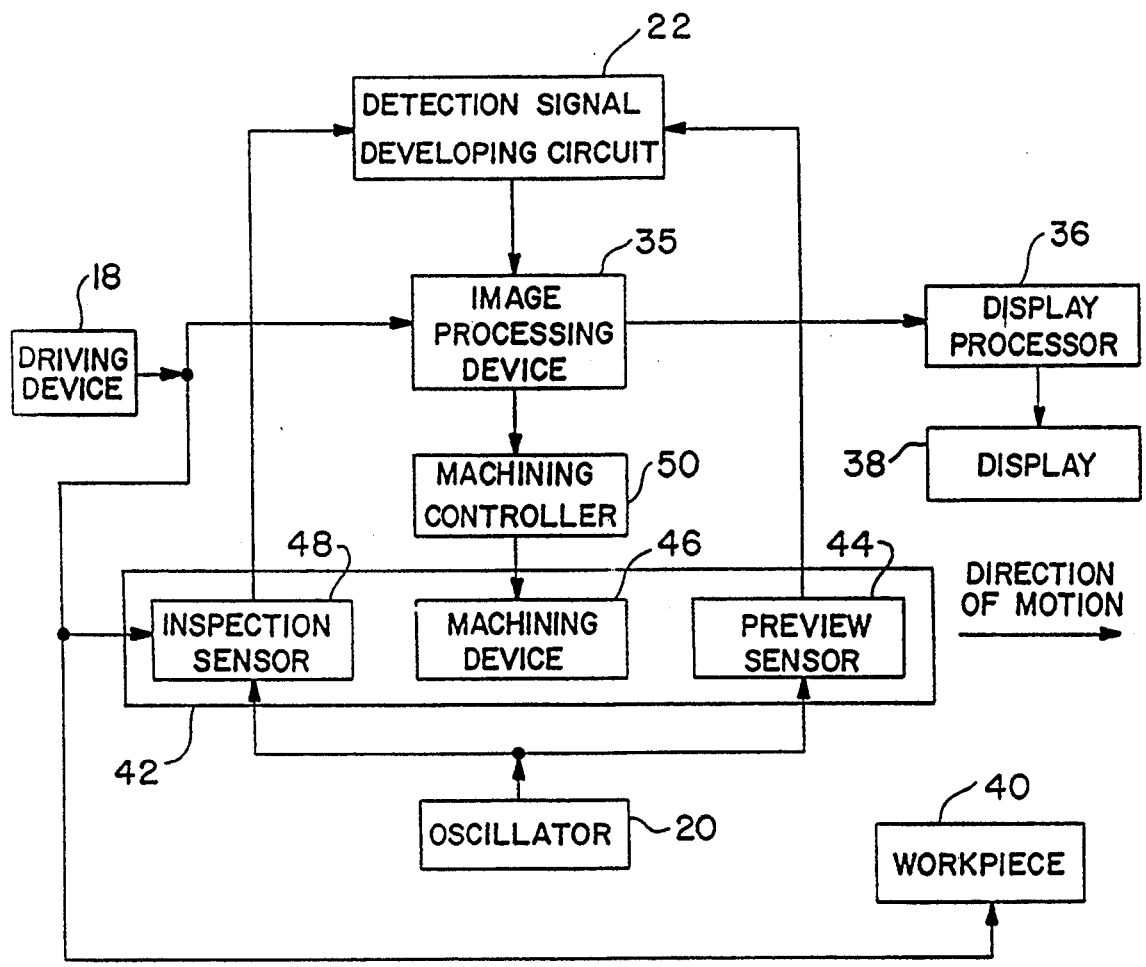
FIG. 6 schematically illustrates a device for monitoring and machining an edge of the workpiece according to a third embodiment of the present invention.

Another embodiment of the present invention is illustrated in FIG. 6 and will be described hereinafter.

FIG. 6 illustrates a system for monitoring and machining a workpiece. A mounting unit 42 is provided which includes a preview sensor 44, a machining device 46 and an inspection sensor 48. The output of the oscillator 20 is connected to the inputs of the preview sensor 44 and the inspection sensor 48. Outputs of the preview and inspection sensors are connected to the detection signal developing circuit 22. The output from the detection signal developing circuit 22 is connected to the input of an image processing device 35. The output of the image processing device 35 is connected to a machining controller 50 and a display processor 36. The output of the machining controller 50 is connected to the input of the machining device 46. A driving device 18 is connected to the mounting unit 42 or the workpiece 40 and the image processing device 35. The output of the image processing device 35 is connected to the display processor 36 and the output of the display processor 36 is also connected to the display 38. The preview sensor 44 is disposed in the front portion of the mounting unit 42 with respect to the direction of motion of the mounting unit 42, the machining device 46 is placed behind the preview sensor 44 and the inspection sensor 48 is placed behind the machining device 46 as shown in FIG. 6.

The system of the present embodiment operates similar to the first embodiment in general. The oscillator 20, the detection signal developing circuit 22, the display processor 36, the driving device 18, and the display 18 of the present embodiment provide similar functions as the same elements in the first embodiment. The present embodiment further includes the mounting unit 42 in place of the sensor 10. The preview sensor 44 initially monitors the workpiece 40 and develops capacitance signals that are input to the detection signal developing circuit 22 for developing the modulated voltage signals as in the first embodiment. The modulated voltage level signals are then input to the image processing device 35 which develops image signals. The image signals are input to the machining controller 50 for developing control signals that are input to the machining device 46. The control signals are used to drive the machining device 46 in order to remove imperfections that are discovered on the surfaces of the workpiece that is monitored by the preview sensor 44. The machining controller circuit 50 may be developed by one of ordinary skill in the art for developing control signals which adjust the machining device 46 for machining the surfaces.

An inspection sensor 48 monitors the surfaces directly after the surfaces have been machined and provides a capacitance signal to the detection signal developing circuit 22 so that image signals can be developed by the image processing device 35. The machined surface may be imaged for inspection purposes immediately after the surface has been machined. The image signals from the image processing device 35 via the inspection sensor 48 and the detection signal developing circuit 22 may be displayed on the display 38 in response to the display processors 36 and the driving device 18 in a manner similar to the first embodiment.

The machining device 46 of FIG. 6 may include a deburring device for removing burrs from desired edges of the workpiece. Also, the machining device 46 may include a chamfering device for chamfering desired edges of the workpiece to predetermine dimensions.

In another embodiment, the preview sensor 44 may include first and second sensors devices that are separated by a predetermined distance. By moving the location of the mounting unit 42 with respect to the workpiece 40, the feed rate of the workpiece 40 may be measured. The images produced by image processing device 35 for the first and second sensors of the preview sensor 44 will be the same but will be acquired at different times. The image processing device 35 calculates the feed rate based on the different times that the two images are acquired and the predetermined distance between the first and second sensors of the preview sensor 44.

In order to determine the dimensions of a chamfered edge with the data acquired in the above described embodiment, a two step process of calibration and model-based signal processing is required. The first calibration and modeling process step relates the actual changes in the geometry of the sensor and the workpiece to the sensor output. The sensor is placed at a number of known distances above a flat metal plate and the output value from the sensor is recorded. Many mathematical models may be used for the data in order to determine the dimensions of the chamfered edge. Examples of the mathematical models used are a conventional first order model and non-linear least squares (NLS) curve fitting techniques which determine the parameters by a model equation:

$$y(x) = \begin{cases} b; & x < d_0 \\ b - ce^{-a(x-d_0)}; & x \geq d_0 \end{cases} \quad (1)$$

Figure 7:
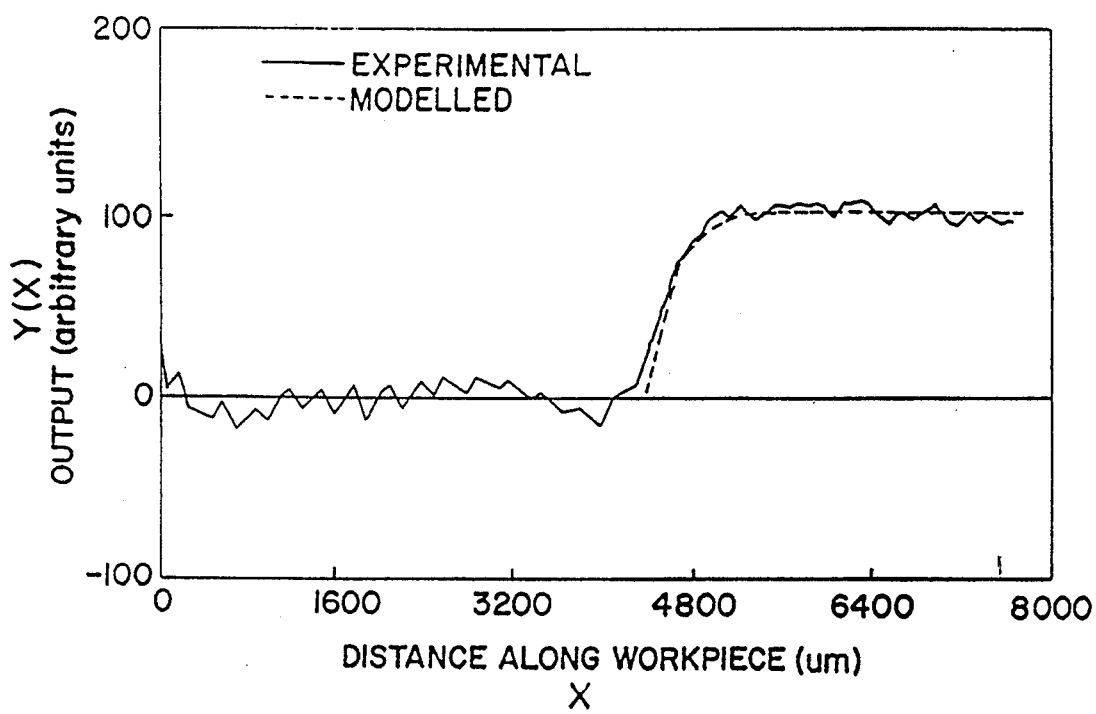
FIG. 7 illustrates calibration data from a sensor that is analyzed by a first non-linear least squares (NLS) algorithm in another embodiment of the present invention for developing a measured value of the spatial resolution parameter of the sensor.

FIG. 7 shows a comparison between the experimental and modeled values. The parameter a is derived from the model equation for use in the following step.

In the second step, the sensor is perpendicularly passed over the chamfered edge and data is acquired for the values. Another NLS curve fitting technique is performed in order to fit the data in another mathematical model equation:

$$y(x) = \quad (2)$$

$$\begin{cases} s; & x < d_1 \\ s + k\left[\dfrac{x - d_1}{a} - \dfrac{1}{a^2}(1 - e^{-a(x-d_1)})\right]; & d_1 \leq x < d_2 \\ s + k\left[\dfrac{d_2 - d_1}{a} - \dfrac{1}{a^2}(e^{-a(x-d_1)} - e^{-a(x-d_2)})\right]; & x \geq d_2 \end{cases}$$

Figure 8:
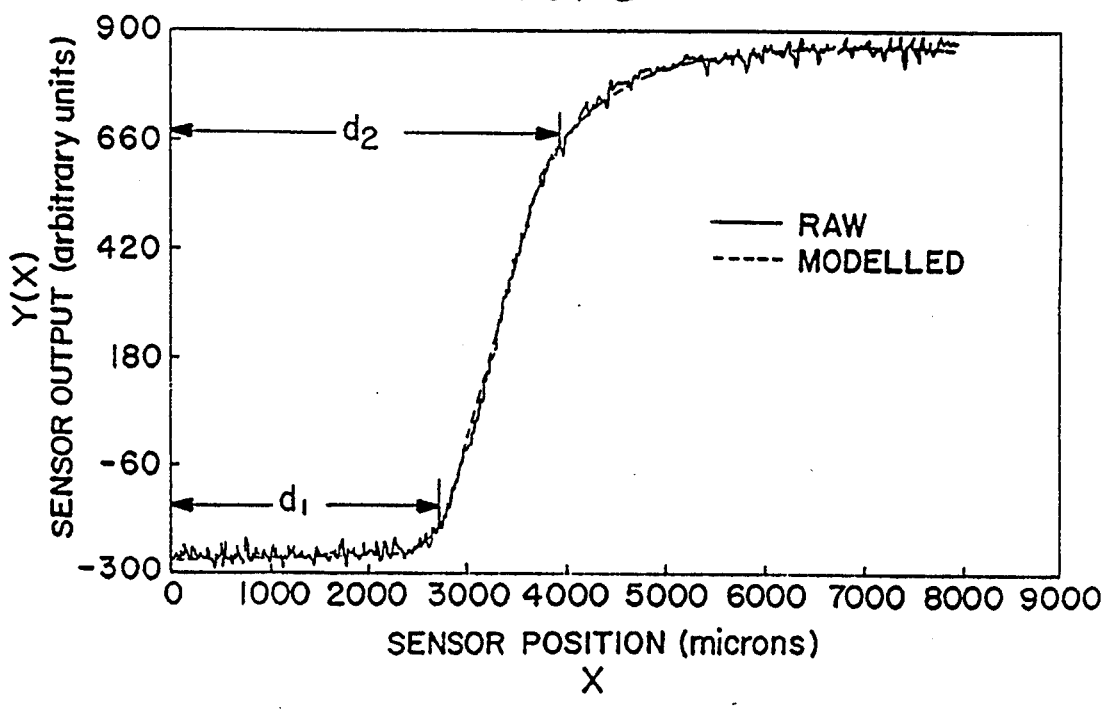
FIG. 8 illustrates measured data from the sensor for determining the chamfer dimension of an actual machined edge by a second non-linear least squares (NLS) algorithm for calculating the parameters of the chamfer dimensions of the machined edge in another embodiment of the present invention.

The model shown in FIG. 8 is a response of a first order system to an input similar to a step response having a finite slope for the rising edge. The parameters determined from this technique correspond to features the chamfer. The parameters are related to the chamfered dimensions by straight forward relationships, for example, the distance $d_2 - d_1$ is linearly related to the edge break dimension of the chamfer. FIG. 8 shows a comparison of the modeled data to the raw data. The conventional first order model for NLS curve fitting techniques are described in *Numerical Recipes In C,* by Press, Flannery, Teukolsky and Betterling and Press, Cambridge University Press, 1988.

In another embodiment of the present invention, the width, height and thickness of a weld pool on a workpiece and the weld back-side penetration resulting from a welding process can be determined. In conventional contacting sensor systems, high resolution imaging of a weld pool cannot be performed because a large electrical potential is applied to the workpiece. The welding process may easily apply a current of approximately 200 A to the metal workpiece which produces noise potentials that seriously degrade the sensor output. The dimensions of the weld pool has been conventionally measured by electrically exciting the weld pool with the welding torch current which makes the weld pool vibrate. The frequency of the vibrations are related to the dimensions of the weld pool. Thereby, a camera and an image processor measures the frequency optically in order to calculate the dimensions of the weld pool.

The noncontacting sensor system of the present invention allows the width, height, thickness and the weld back-side penetration of a weld pool to be imaged without affecting the shape of the weld pool on the workpiece by providing a noncontact and nonoptical imaging sensor having the resolving power to image features of small dimensions. Because the sensor is not electrically connected to the workpiece, an improved imaging system for the desired surfaces of the workpiece will result. The weld back-side penetration, which is the condition when the joint on the back side of the weld has melted together, is imaged by a sensor for the back side of the workpiece. The imaging by the sensor is used to determine when the season has been filled with molten metal.

In the present invention, any effects in the electric field are entirely sensed by the first and second sensing electrodes of the sensor so that the sensor does not contact the workpiece. Because the sensor is not electrically connected to the workpiece, electrically conducting workpieces, as well as insulating workpieces having a significant conductivity or a dielectric constant significantly different from air (i.e., a dielectric constant 10% greater than air), may be imaged. Also, the sensor of the present invention will not incur uncertain effects of wear on the calibration parameters and will not alter the edge finish of the workpiece because the sensor of the present invention does not contact the workpiece. Therefore, the sensor of the present invention reduces costs and maintenance time because less sensor replacement and calibration is required.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A method for machining desired surfaces of a workpiece, comprising the steps of:
   (a) positioning sensor means and machining means above and in proximity to the workpiece;
   (b) developing an electric field between first and second sensing electrodes of said sensor means in response to input signals applied to said sensor means;
   (c) changing the location of said sensor means and said machining means with respect to the desired surfaces of the workpiece;
   (d) sensing any effects in said electric field produced by the workpiece being disposed within the electric field;
   (e) developing image signals in response to said steps (c) and (d);
   (f) adjusting said machining means according to said image signals from said step (e); and
   (g) machining the desired surfaces of the workpiece by said machining means in response to said image signals.

2. A method according to claim 1, wherein said sensor means comprises a preview sensor and an inspection sensor.

3. A method according to claim 1, further comprising the steps of:
   (h) developing said electric field between first and second sensing electrodes of said sensor means in response to applying said input signals thereto;
   (i) sensing any effects in said electric field produced by the workpiece being disposed within said electric field;
   (j) developing coordinate signals indicative of the location of said sensor means;
   (k) developing display signals in response to any effects sensed in said electric field at said step (i); and
   (l) displaying an image of the desired surfaces of the workpiece corresponding to said output display signals and said coordinate signals.

4. A method for deburring desired edges of a workpiece comprising the steps of:
  (a) positioning sensor means and deburring means above and in proximity to the workpiece;
  (b) developing an electric field between first and second sensing electrodes of said sensor means in response to input signals applied to said sensor means;
  (c) chamfering the desired edges of the workpiece with respect to the location of said sensor means and said deburring means;
  (d) sensing any effects in said electric field produced by the workpiece being disposed within said electric field;
  (e) developing image signals in response to said steps (c) and (d);
  (f) adjusting said deburring means according to said image signals; and
  (g) deburring the desired edges of the workpiece by said deburring means in response to said image signals.

5. A method according to claim 4, wherein said sensor means comprises a preview sensor for sensing any effects in said electric field before said step (g) and an inspection sensor for sensing any effects in said electric field after said step (g).

6. A method according to claim 5, further comprising the steps of:
  (h) developing said electric field between first and second sensing electrodes of said inspection sensor in response to applying said input signals thereto;
  (i) detecting changes in said electric field between said sensor means and the workpiece after said step (g);
  (j) developing coordinate signals indicative of the location of said inspection sensor;
  (k) developing display signals in response to any effects sensed in said electric field at said step (i); and
  (l) displaying an image of the desired edges of the workpiece corresponding to said display signals and said coordinate signals.

7. A method for chamfering desired edges of a workpiece to predetermined dimensions, comprising the steps of:
  (a) positioning sensor means and chamfering means above and in proximity to the workpiece;
  (b) developing an electric field between first and second sensing electrodes of said sensor means in response to input signals applied to said sensor means;
  (c) changing the location of said sensor means and said chamfering means with respect to the desired edges of the workpiece;
  (d) sensing any effects in said electric field produced by the workpiece being disposed within said electric field;
  (e) developing image signals in response to said step (d);
  (f) adjusting said chamfering means according to said image signals; and
  (g) chamfering the desired edges of the workpiece to the predetermined dimensions by said chamfering means in response to said image signals.

8. A method according to claim 7, wherein said sensor means comprises a preview sensor for sensing any effects in said electric field before said step (g) and an inspection sensor for sensing any effects in said electric field after said step (g).

9. A method according to claim 8, further comprising the steps of:
  (h) developing said electric field between first and second sensing electrodes of said inspection sensor in response to applying said input signals thereto;
  (i) sensing any effects in said electric field produced by the workpiece being disposed within said electric field;
  (j) developing coordinate signals indicative of the location of said sensor; and
  (k) imaging the desired edges of the workpiece from said inspection sensor in response to said steps (i) and (j).

10. A system for machining desired surfaces of a workpiece, comprising:
  mounting means being positioned above and in proximity to the workpiece, said mounting means including:
    sensor means for identifying and locating defects on the desired surfaces of the workpiece, and
    machining means for machining the desired surfaces of the workpiece;
  field generating means for generating an electric field between first and second sensing electrodes of said sensor means by applying input signals to said sensor means;
  driving means for changing the location of said mounting means with respect to the desired surfaces of the workpiece and developing coordinate signals indicative of the location of said sensor means with respect to the desired surfaces of the workpiece;
  field sensing means for sensing any effects in said electric field in response to said sensor means being driven by said driving means;
  image processing means for developing image signals of the desired surfaces in response to any effects in said electric field sensed by said field sensing means and said coordinate signals from said driving means; and
  adjusting means for adjusting said machining means in response to said image signals and smoothing the desired surfaces of the workpiece.

11. A system according to claim 10, further comprising:
  display processing means for developing display signals in response to any effects in said electric field sensed by said field sensing means; and
  display means for displaying a profile of the desired surfaces of the workpiece in response to said display signals and said coordinate signals.

12. A system according to claim 10, wherein said machining means comprises means for deburring and chamfering the workpiece.

13. A system according to claim 10, wherein said sensor means comprises preview sensor means for sensing any effects in said electric field before the desired surfaces of the workpiece are machined and inspection sensor means for sensing any effects in said electric field after the desired surfaces of the workpiece are machined.

14. A system according to claim 13, wherein said mounting means comprises a surface having a front portion and a rear portion with said preview sensor means being positioned near said front portion, said machining means being positioned between said preview sensor means and said rear portion, and said inspection sensor means being positioned between said machining means and said rear portion.

15. A system according to claim 10, wherein said first sensing electrode receives said input signals and said second sensing electrode develops capacitance signals corresponding to any disturbances in said electric fields.

16. A system according to claim 10, wherein said sensor means comprises an array of first and second sensing electrodes.

17. A system for chamfering desired edges of a workpiece to predetermined dimensions, comprising:
  mounting means being positioned above and in proximity to the workpiece, said mounting means including:
    sensor means for monitoring the dimensions of the desired edges of the workpiece, and
    chamfering means for chamfering said desired edges of the workpiece to the predetermined dimensions;
  field generating means for generating an electric field between first and second sensing electrodes of said sensor means by applying input signals to said sensor means;
  driving means for changing the location of said mounting means with respect to the desired edges of the workpiece and developing coordinate signals indicative of the location of said sensor means with respect to the desired edges of the workpiece;
  field sensing means for sensing any effects in said electric field in response to said sensor means being driven by said driving means;
  image processing means for developing image signals of the desired surfaces in response to any effects in said electric field sensed by said field sensing means and said coordinate signals from said driving means; and
  adjusting means for adjusting said chamfering means in response to said image signals and chamfering the desired edges of the workpiece to the predetermined dimensions.

18. A system according to claim 17, wherein said sensor means comprises preview sensor means for sensing any effects in said electric field before the desired edges of the workpiece are chamfered and inspection sensor means for sensing any effects in said electric field after the desired edges of the workpiece are chamfered.

19. A system according to claim 18, wherein said mounting means comprises a surface having a front portion and a rear portion with said preview sensor means being positioned near said front portion, said chamfering means being positioned between said preview sensor means and said rear portion, and said inspection sensor means being positioned between said chamfering means and said rear portion.

20. A system according to claim 17, wherein said first sensing electrode receives said input signals and said second sensing electrode develops capacitance signals corresponding to any disturbances in said electric field and indicative of the dimensions of the desired edges.

21. A system according to claim 17, wherein said sensor means comprises an array of first and second sensing electrodes.

22. A system according to claim 21, wherein said array of electrodes comprises a plurality of input first sensing electrodes for receiving said input signals and a plurality of second sensing electrodes for developing capacitance signals corresponding to any disturbance in said electric field and the dimensions of said angles of the desired edges.

23. A system for deburring desired edges of a workpiece, comprising:
  mounting means being positioned above and in proximity to the workpiece, said mounting means including:
    sensor means for identifying and locating burrs on desired edges of the workpiece, and
    deburring means for removing said burrs from the workpiece;
  field generating means for generating an electric field between first and second sensing electrodes of said sensor means by applying input signals to said sensor means;
  driving means for changing the location of said mounting means with respect to the desired edges of the workpiece and developing coordinate signals indicative of the location of said sensor means with respect to the desired edges of the workpiece;
  field sensing means for sensing any effects in said electric field in response to said sensor means being driven by said driving means;
  image processing means for developing image signals of the desired edges in response to any effects in said electric field sensed by said field sensing means and said coordinate signals from said driving means; and
  adjusting means for adjusting said deburring means in response to said image signals and removing said burrs in order to smooth the desired edges of the workpiece.

24. A system according to claim 23, wherein said sensor means comprises preview sensor means for sensing any effects in said electric field before the desired edges of the workpiece are deburred and inspection sensor means for sensing any effects in said electric field after the desired edges of the workpiece are deburred.

25. A system according to claim 24, wherein said mounting means comprises a surface having a front portion and a rear portion with said preview sensor means being positioned near said front portion, said deburring means being positioned between said preview sensor means and said rear portion, and said inspection sensor means being positioned between said deburring means and said rear portion.

26. A system according to claim 23, wherein said first sensing electrode receives said input signals and said second sensing electrode develops capacitance signals corresponding to any disturbances in said electric field and indicative of the size of said burrs.

27. A system according to claim 23, wherein said sensor means comprises an array of first and second sensing electrodes.

28. A system according to claim 27, wherein said array of first and second sensing electrodes comprises a plurality of first sensing electrodes for receiving said input signals and a plurality of second sensing electrodes for developing capacitance signals corresponding to any disturbances in said electric field and indicative of the size of said burrs.

29. A system according to claim 23, wherein said field sensing means comprises:
  a first amplifier for amplifying capacitance signals from said sensor means corresponding to changes in said electric field and indicative of the size of said burrs;
  synchronous detection means for detecting a component of said capacitance signals at the same frequency and phase as said input signals;
  low pass filtering means for filtering said component of said capacitance signals; and
  a second amplifier for developing voltage level signals corresponding to said capacitance signals.

* * * * *